United States Patent [19]

Kawai et al.

[11] 4,367,931

[45] Jan. 11, 1983

[54] ELECTROMAGNETICALLY DRIVEN DIAPHRAGM DEVICE

[75] Inventors: Tohru Kawai, Kawasaki; Makoto Masunaga, Tokyo, both of Japan

[73] Assignee: Canon Kabushiki Kaisha, Tokyo, Japan

[21] Appl. No.: 187,742

[22] Filed: Sep. 16, 1980

[30] Foreign Application Priority Data

Sep. 17, 1979 [JP] Japan .............................. 54-119047

[51] Int. Cl.³ .......................... G03B 7/095; G03B 9/07
[52] U.S. Cl. .................................. 354/23 D; 354/44; 354/271; 352/141; 335/223
[58] Field of Search ............... 354/23 D, 40–44, 354/271, 274, 228, 229, 233, 234; 335/219, 222, 223; 352/141

[56] References Cited

U.S. PATENT DOCUMENTS 4,100,558  7/1978  Koike et al. ...................... 354/271
4,210,393  7/1980  Ishiguro et al. .................. 354/43 X

*Primary Examiner*—G. Z. Rubinson
*Assistant Examiner*—S. D. Schreyer
*Attorney, Agent, or Firm*—Toren, McGready & Stanger

[57] ABSTRACT

In the disclosed diaphragm device, an electromagnetic unit is composed of two opposing sets of circularly arranged magnets poled so that opposing surfaces have the same polarity, a rotary member carrying an electromagnetic coil that moves the rotary member in response to current therethrough and the field of the magnets, and diaphragm blades which are positioned between the magnet members and the rotary member and pivoted to close the aperture in response to rotation of the rotary member in one direction. When the rotary member is rotating in the closing direction, stopping means respond to an input signal and stop movement of the diaphragm blades at a particular aperture value.

7 Claims, 14 Drawing Figures

ELECTROMAGNETICALLY DRIVEN DIAPHRAGM DEVICE

BACKGROUND OF THE INVENTION

This invention relates to photographic cameras and, more particularly, to electromagnetically driven diaphragm devices.

DESCRIPTION OF THE PRIOR ART

Conventional diaphragms in interchangeable lenses of single lens reflex cameras generally cooperate with setting and stop-down levers, or mechanically operated control apparatuses on the camera housings. The diaphragm-setting lever sets the extent of movement of the diaphragm blades on the basis of an exposure value. The diaphragm stop-down lever moves the blades until they reach the aperture set by the setting lever. Because the diaphragm is controlled by mechanical actuating signals, the accuracy of the exposure control depends upon the precision of the signal transmitting mechanisms. As requirements for exposure accuracy become more rigorous, the desired improvements in the response characteristics of these mechanisms and the precision of the diaphragm opening call for a great increase in the complexity of the resulting structure and give rise to problems in the selection of suitable materials which would make the constituents amenable to sufficiently high machining accuracy.

An object of the invention is to improve cameras and, particularly, diaphragms for cameras.

Another object of the invention is to improve diaphragm devices in interchangeable lenses.

Still another object of the invention is to overcome the aforementioned difficulties.

SUMMARY OF THE INVENTION

According to a feature of the invention, an electromagnetically operated diaphragm device for a lens assembly is composed of an electromagnetic unit having a plurality of magnet members arranged around an optical axis in two circles within the lens assembly and oriented so that their surfaces facing each other are of the same polarity, a rotary member arranged in a space between the two circles of magnet members and carrying an electromagnetic induction coil, and diaphragm blades positioned between the magnet members and the rotary member and pivoted on the rotary member so as to form a variable aperture opening depending upon the position of rotation of the rotary member. Diaphragm blade stopping means stop movement of the diaphragm blades when they are rotated by the rotary member so that the size of the aperture opening defined by the diaphragm blades is adjusted to a predetermined value.

These and other features of the invention are pointed out in the claims. Other objects and advantages of the invention will become evident from the following detailed description when read in light of the accompanying drawings.

BRIEF DESCRIPTION OF THE DRAWINGS

FIG. 10a is an elevational view of an arrangement which makes it possible to manually operate the diaphragm unit of FIGS. 1 to 5.

FIG. 10b shows another example of modification of the means of FIG. 10a.

DETAILED DESCRIPTION OF PREFERRED EMBODIMENTS

Figure 1:
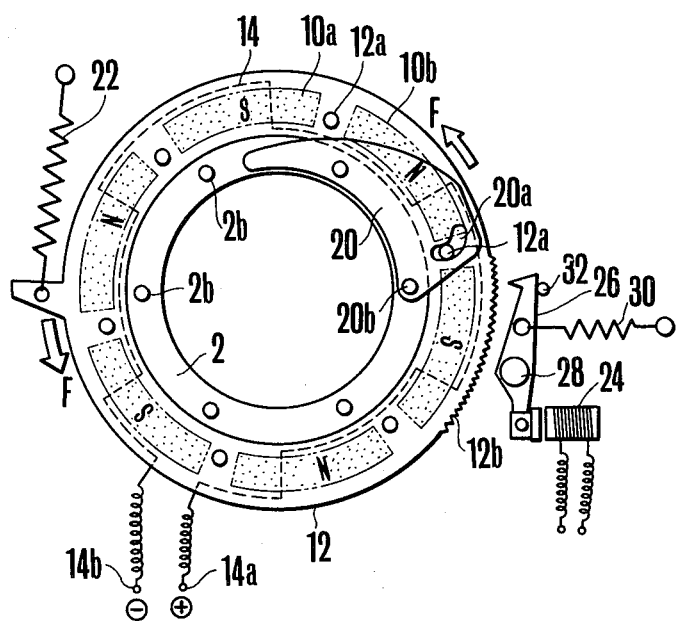
FIG. 1 is an elevation of a diaphragm unit embodying the present invention.
Figure 2:
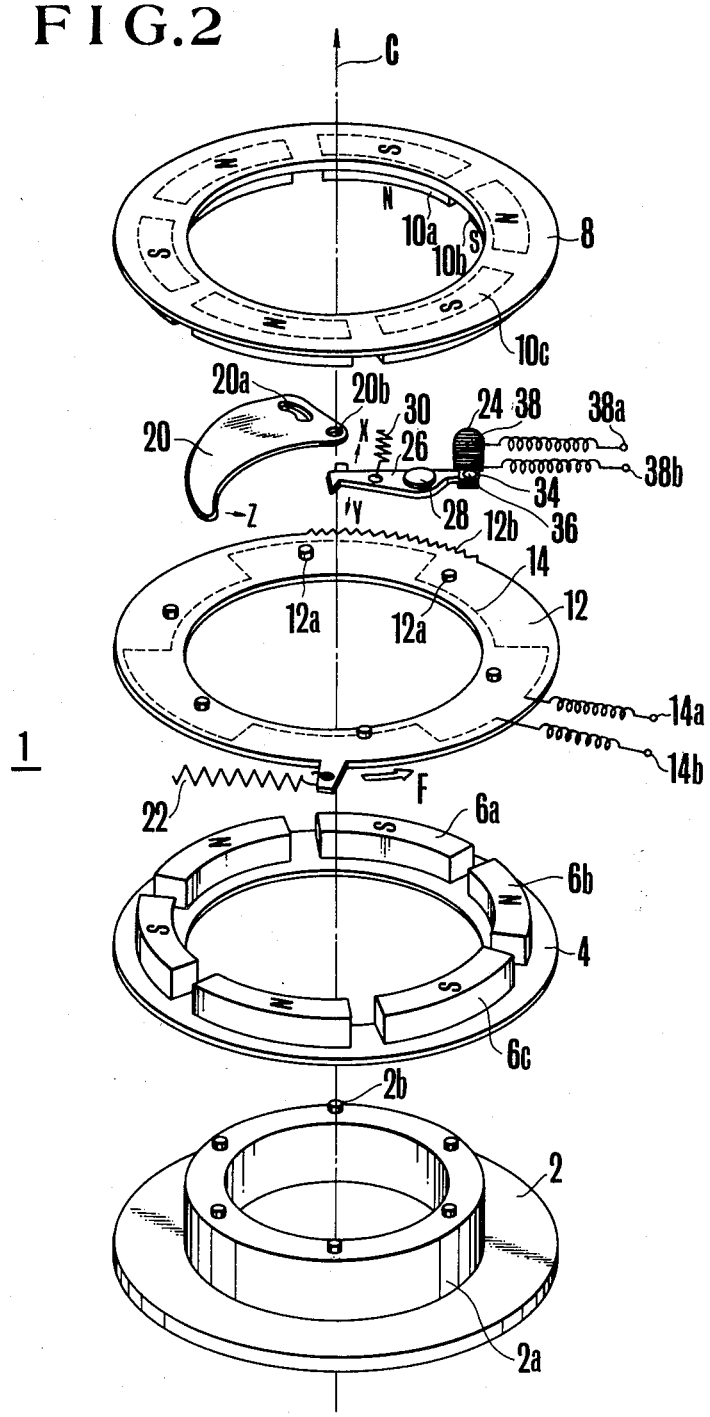
FIG. 2 is an exploded perspective view of the diaphragm unit of FIG. 1.

In FIGS. 1 and 2, a diaphragm unit 1 within a lens barrel includes a ring-shaped base plate 2 fixed at a suitable position within the lens barrel. The base plate 2 fixedly supports a cylindrical portion 2a which carries a number of pins 2b that serve as pivot axles for diaphragm blades, of which a single diaphragm blade 20 is shown. A first stationary ring-shaped plate 4 is fitted and fixedly secured on the outer diameter of the cylindrical portion 2a of the base plate 2. A second ring-shaped stationary plate 8 fixedly mounted in the lens barrel is spaced from the first stationary plate 4 to create an air space occupied by a rotary member 12.

The surfaces of the first and second stationary plates 4 and 8 which confront either surface of the rotary member 12 support arcuate permanent magnet elements 6a to 6f and 10a to 10f in respective circles with centers at the optical axis C of the lens barrel. The pairs of permanent magnet elements 6a and 10a, 6b and 10b, 6c and 10c, . . . 6f and 10f mounted on the respective stationary plates 4 and 8 are axially aligned and spaced from each other to allow the rotary member 12 to move therebetween. The magnet elements 6a to 10f are axially magnetized and the polarities of the poles of the aligned magnet elements in each pair 6a and 10a . . . 6f and 10f are opposite each other. The magnet elements 6a to 6f and 10a to 10f on each of the stationary plates 4 and 8 alternate in polarity.

The base plate 2, the first and second stationary plates 4 and 8, and rotary member 12 form a central aperture for light from an objective lens mounted on the optical axis C. The light reflected from an object being photographed is refracted by the objective lens and passes through the aforementioned central aperture to a photographic material.

An induction coil 14 is fixedly mounted or printed on the surface of the rotary member 12. The coil 14 is supplied with current through terminals 14a and 14b to produce a magnetic flux in the space between the permanent magnet elements 6a to 6f and 10a to 10f. The circular surface of the member 12 also carries a plurality of pins for controlling the pivotal movement of the diaphragm blades 20, of which only one of six is shown.

As shown in FIG. 2, the diaphragm blades 20 are arranged in the space between the rotary member 12 and the second stationary plate 8, and vary the size of the opening of the diaphragm aperture in the rotary member. The first stationary plate 4 is fitted around the outer diameter of the cylindrical portion 2a of the base plate 2. The rotary member 12 is aligned therewith. The diaphragm blades 12 are assembled with their arcuate slots 20a fitting on the pins 12a and their holes 20b fitting on the pins 2b. The stationary plate 8 covers the member 12 to produce a complete diaphragm unit.

As the rotary member 12 turns in the direction of the arrow F, the diaphragm blades 20 pivot about the pins 2b by virtue of the pins 12a engaging the arcuate slots 20a and, hence, vary the size of the opening of the aperture defined by the inner edges 20c of the blades 20. Movement of the rotary member 12 occurs when the coil 14 is supplied with current and the thus produced magnetic flux interacts with the magnetic field of the permanent magnet elements 6a to 10a so as to exert a force in the direction F on the basis of Fleming's law. This force rotates the rotary member 12 whose motion is transmitted to the diaphragm blades 20 by engagement of the slots 20a and pins 12a, as well as the pivoting action of the pins 2b and holes 20b.

A tension spring or other biasing member 22 connecting the rotary member 12 with the casing (not shown) of the diaphragm unit or to the lens barrel, is extended by the force F when current flows through the coil 14. When current through the coil 14 is absent and no driving force on the rotary member 12 exists, the spring 22 urges the rotary member 12 in the direction opposite to the force F. Hence, the rotary member 12 normally assumes a position where the diaphragm blades form the maximum possible aperture opening.

An electromagnet 24 and a pawl lever 26 form part of an arresting arrangement for the rotary member 12. An axle 28 mounted on the casing, housing, or lens barrel (not shown), pivotally supports the pawl lever 26 so that the latter's pawl at its extreme end is engageable with one of the teeth of a rack 12b formed in a portion of the outer periphery of the rotary member 12. A spring 30 urges the pawl lever 26 clockwise until it abuts a pin 32 mounted on the casing. An armature 34 for the electromagnet 24 is fixedly carried on the end of the pawl lever 26 opposite to the pawl engageable with the rack 12b. The electromagnet 24 includes a coil with ends 38a and 38b. When the coil 38 is energized, the electromagnet 24 attracts the armature 34 and moves the pawl of the lever 26 into engagement with the rack 12b against the force of the spring 30.

In operation, before energization of the coil 14 of the diaphragm unit in FIGS. 1, 2, and 2a, the spring 22 draws the rotary member 12 to an initial position, limited by a pin (not shown), where the diaphragm blades 20 are fully open. When a camera release is actuated, a current supply circuit for the coil 14 is rendered operative and current flows through the coil 14. Since the direction of current flow through the coil 14 on the rotary member 12 is normal to the direction of the magnetic flux of the permanent magnet elements 6a to 10a on the stationary plates 4 and 8, the flow through the radial portions of coil 14 causes an electromagnetic force of tangential direction to be exerted on the rotary member 12. Therefore, the rotary member 12 turns counterclockwise about the optical axis against the force of the spring 22. Such movement of the rotary member 12 causes the diaphragm blades to close down. Then, when a predetermined angle of rotation of rotary member 12 is reached, the electromagnetic coil 38 is energized. This causes the electromagnetic force of the electromagnet 24 to turn the pawl lever 26 counterclockwise about the pivot pin 28 and against the force of the spring 30 until the pawl end engages one of the teeth of the rack 12b. This stops the rotary member 12 and prevents further rotation thereof.

The stopped position of the rotary member 12 establishes a particular angle of rotation for each of the diaphragm blades by virtue of the orientation of the arcuate slots 20a relative to the pins 12a on the rotary member 12. This completes the setting of the diaphragm unit to a required aperture value.

When the exposure is terminated, and the power supply to the magnet 38 is cut off, the electromagnet 24 no longer attracts the armature 34. The return spring 30 then turns the pawl lever 26 clockwise and disengages the pawl from the rack 12b. Since the coil 14 on the rotary member 12 has now also been de-energized, the rotary force caused by the electromagnetic force no longer exists on the rotary member 12. Disengagement of the pawl lever 26 from the rack 12a allows the return spring 22 to turn the rotary member clockwise to the initial position where the diaphragm blades fully open the aperture.

It will be understood from the foregoing that in the embodiment of FIGS. 1, and 2, the power supply to the coil 14 is controlled in timed relation to the actuation of the camera release, so that the diaphragm blades 20 move from the maximum possible aperture position toward the minimum possible aperture position. An actuating signal applied to the coil 38 arrests the diaphragm blades at a position to establish the required aperture. This makes it possible to control the light value in the optical path along the axis C.

Figure 3:
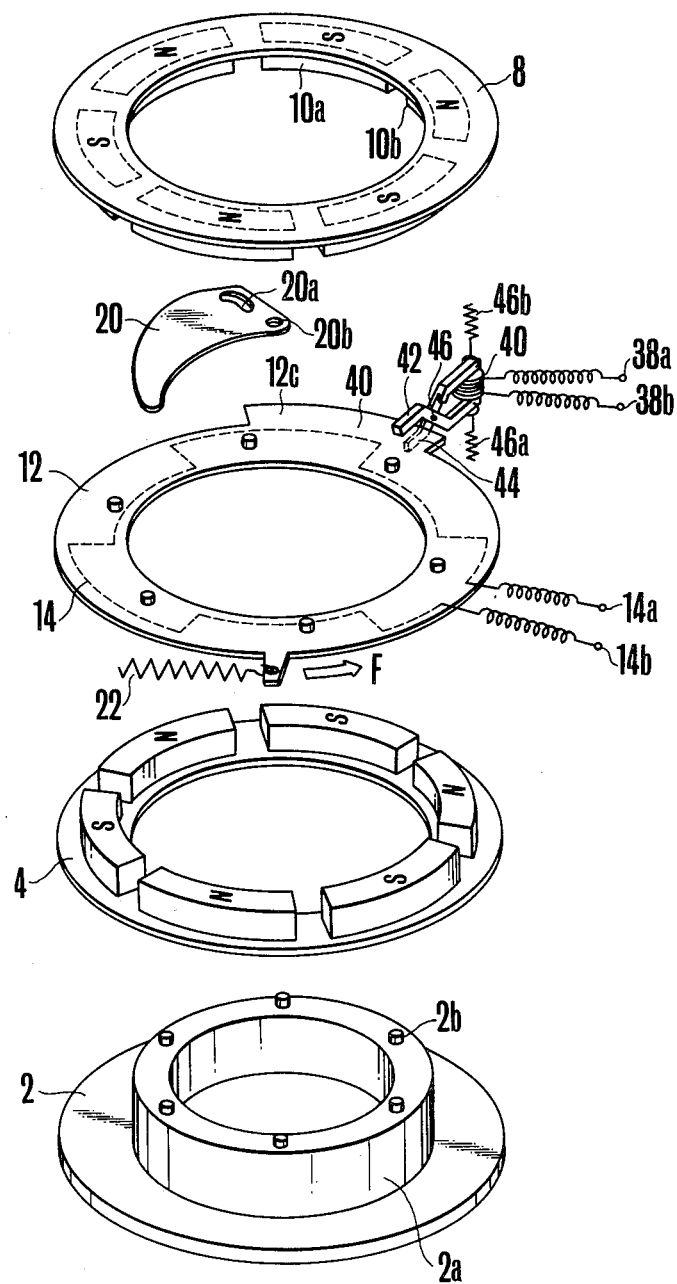
FIG. 3 is a similar view showing another example of a unit whose arresting arrangement takes the form of a braking mechanism.

FIG. 3 illustrates another example of an arresting arrangement in a unit embodying features of the invention. Essentially, the diaphragm unit is similar in construction to that of FIGS. 1, and 2 with respect to the base plate 2, first and second stationary plates 4 and 8, and rotary member 12. However, in this example, the arresting arrangement is constructed in the form of a braking mechanism.

In FIG. 3, instead of the rack 12b, a brake disc 12c extends radially outward from a portion of the rotary member 12. The brake disc 12c is arranged to cooperate with two brake levers 42 and 44 actuated by an electromagnet 40. The brake levers 42 and 44 pivot about a common pin 46 in a manner similar to a pair of scissors. Their operating ends extend above and below the disc 12c. The controlling ends fixedly carry respective armatures. Respective springs 46a and 46b urge the scissor arrangement into an open position so that the levers 42 and 44 move away from the rotary member 12. As the rotary member 12 is turning and varying the size of the aperture from the maximum toward the minimum, and the rotary member arrives at a predetermined position representing a desired aperture, the magnetic winding 40a of the electromagnet 40 is energized. This attracts the levers 42 and 44 against the force of the springs 46a and 46b and closes the levers 42 and 44 on the brake disc 12c. As a result, the caliper action of the levers 42 and 44 stops the rotary member and the aperture of the diaphragm is adjusted to a required value.

Figure 4A:
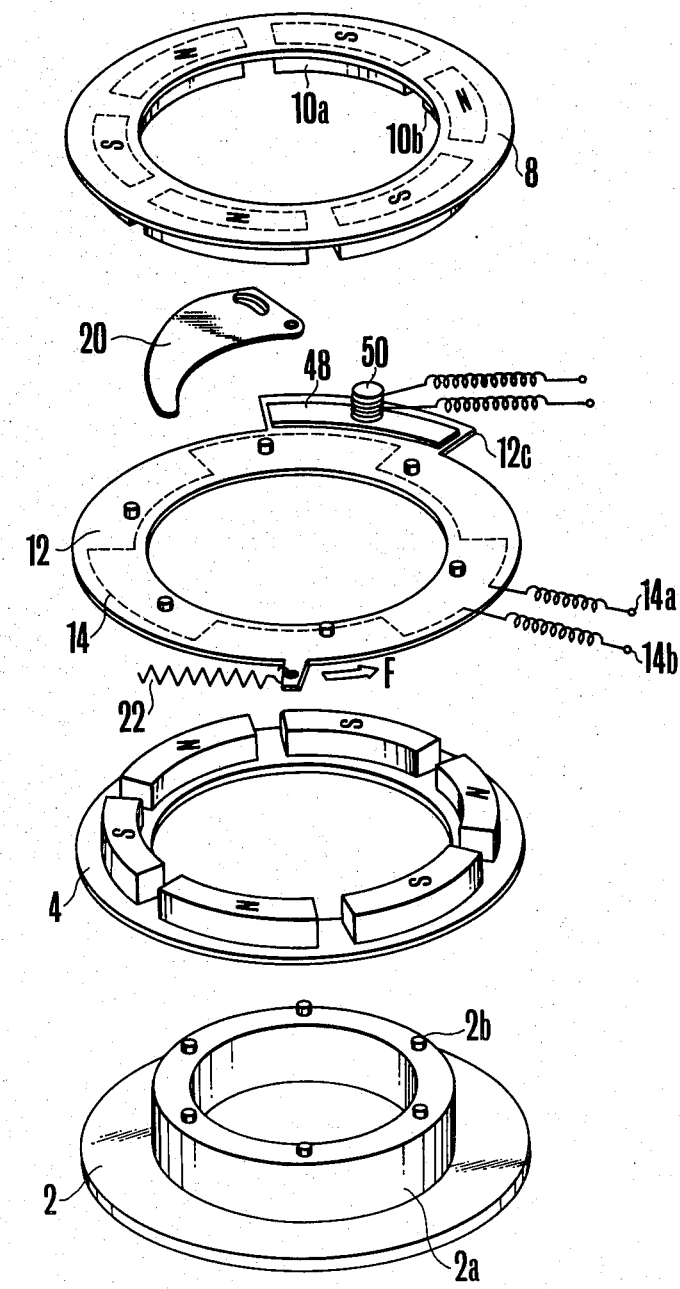
FIG. 4a is a similar view with still another example of the arresting arrangement.

FIG. 4a shows still another example of an arresting arrangement for the unit of FIGS. 1 to 3. A pad 48 of magnetic material is positioned on the disc 12c of the rotary member 12. An electromagnet 50 fixedly mounted to a lens barrel (not shown) is positioned above the pad 48 so that upon energization, it attracts the pad 48 and stops the rotary member 12.

The present invention as embodied in FIGS. 1 to 4a provides a diaphragm unit comprising an apertured rotary member 12 with its center of rotation coincident with the optical axis C, a pair of annular arrangements of permanent magnet elements 6a ... and 10a ... on the opposite side of the rotary member 12, while the polarities of the magnet elements alternate within each annulus and between annuli, and an induction coil affixed to the rotary member 12 and oriented to exert a driving force on the rotary member 12 when energized, a number of diaphragm blades arranged to vary the size of an aperture upon rotary movement of the rotary member, and arresting means responsive to a control timing signal for stopping the rotary member 12 from further rotation.

FIG. 4b shows an interchangeable lens mounting embodying features of the invention and utilizing any one of the diaphragm units of FIGS. 1 to 4a. As an example, it will be assumed that the diaphragm unit used is that shown in FIG. 4a.

In FIG. 4b, the lens mount 200 includes a body tube 201 with a bayonet coupling 201a fixedly mounted at the rear thereof. A lens holder 202 contains lens components L1 to L5. A helicoid ring 203 fits the holder 202 in the inner diameter of the tube body 201. A distance adjusting ring 204 movably mounted on the outer diameter of the body tube 201 is connected to drive the helicoid ring 203 so that rotation of the distance adjusting ring produces axial movement of the lens holder 202.

To incorporate the diaphragm unit, the base plate 2 is first mounted on the front shoulder of a radial flange in the lens holder 202 and is secured thereto. Then the stationary plate 4 is placed on the base plate 2 and secured to the cylindrical portion thereof. The other or second stationary plate 8 is mounted on the lens holder 202 in fixed position relative to the stationary plate 4 and so as to hold the rotary member 12 and the diaphragm blades 20 between the first and second stationary plates.

A diaphragm setting ring 104 is rotatably fitted on the tube body 201. A legged portion 106 extends from the ring 104 and is engageable with an arm projecting from the outer periphery of the rotary member 12. To manually set a desired aperture value, the operator turns the diaphragm setting ring 104 so that the rotary plate 12 turns to open and close the diaphragm blades.

The pad 48 and the electromagnet 50 of the arresting arrangement are located so that a cor portion 50a of the electromagnet fits in a hole formed in a wall of the radial flange of the lens holder 202 and so the pad 48 is movable toward and away from the disc portion 12c of the rotary plate 12.

With respect to the mechanisms illustrated in FIGS. 2, 3 and 4a, the embodiments of the invention which employ the mechanism in FIG. 2 have the advantage of assuring a positive stoppage of the rotary plate because the pawl engages the rack 12b. On the other hand, embodiments using the mechanisms of FIGS. 3 and 4a can stop the rotary plate at any one of a number of continuous positions.

According to another embodiment of the invention, an exposure aperture control system for the camera uses one of the diaphragm units DU in FIGS. 1 to 4b, 5, 10a and 10b one of the control circuit CC which, for example, constitutes any one of those shown in FIGS. 6 to 9.

The diaphragm units of FIGS. 1 to 4 start to operate when current is supplied. They move at speeds depending upon various factors including the strength of the electromagnetic action. At the same time, they have to stop when the size of the aperture opening coincides with the required aperture value. The use of an automatic diaphragm unit requires a diaphragm position sensor. The latter must serve to produce an output capable of adjusting the exposure value computer in the camera at the moment an actuating signal is produced in the exposure control circuit CC and applied to the magnetic control device 24 of the arresting arrangement.

Figure 5:
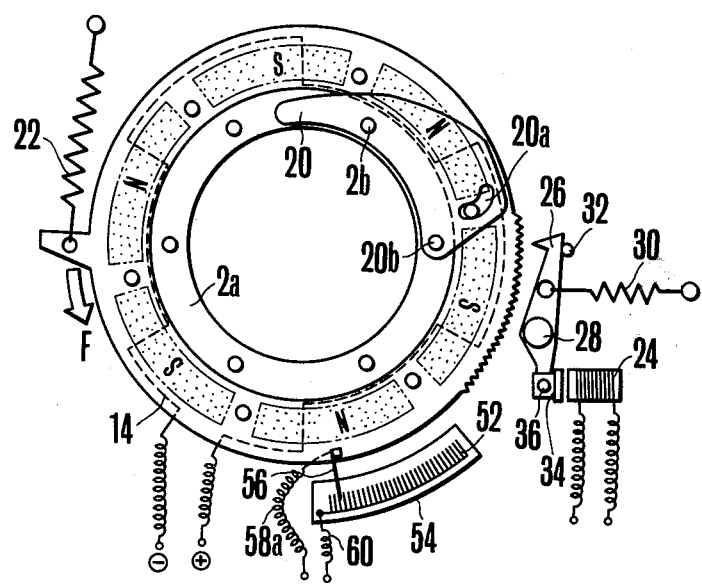
FIG. 5 is an elevational view showing an example of a sensor for electrically sensing the amount of movement of the rotary member of the diaphragm unit of FIG. 1.

A diaphragm unit with such an exposure sensor is shown in FIG. 5. In this example, the sensor measures the angular distance through which the rotary member 12 moves from the fully open aperture or initial position after the start of current supply to the coil 14. The constituent parts other than those denoted by 52 to 60a and 60b are similar to those shown in FIG. 2. A comb 52 of tooth-like electrodes deposited on an electrically insulating substrate 54 fixedly mounted on the casing (not shown) of the diaphragm unit is positioned adjacent the outer periphery of the rotary member 12. A slider has one end thereof carried by the rotary member 12 in the vicinity of its outer periphery and extends to slide along the electrodes of the comb 52. The electrodes of the comb 52 and the slider 56 have lead wires 60 and 58, respectively for electrical connection to the control circuit CC.

Figure 6:
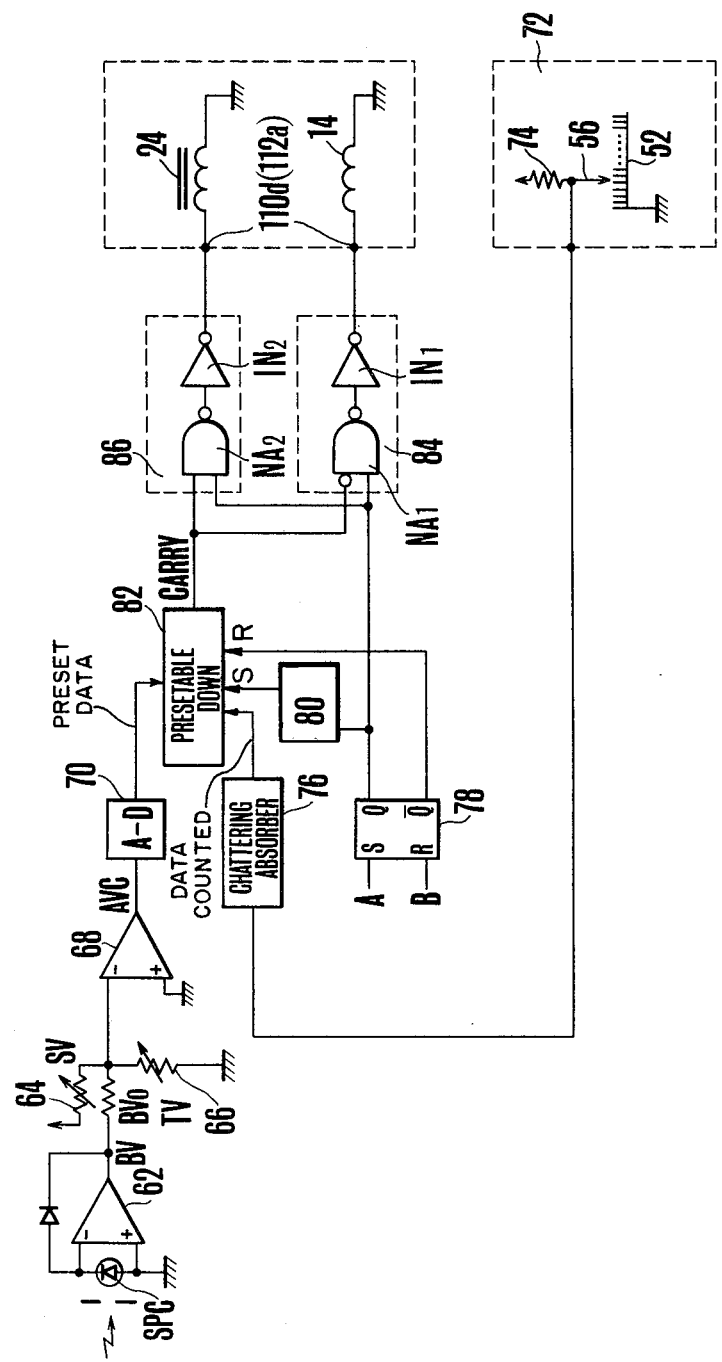
FIG. 6 is a circuit diagram, partly in block form, of a drive control for a rotary member and a current supply control of an arresting arrangement.

FIG. 6 shows an example of the control circuit CC including a light metering circuit for producing an output in the form of an electrical signal Bv representing the brightness of an object being photographed. The metering circuit includes a light sensitive element or SPC, an operational amplifier 62 and a diode D.

Variable resistors 64 and 66 form exposure factor setting means cooperating with a film speed dial and a shutter dial both forming part of the input MI on the camera housing and produce outputs in the form of electrical signals with magnitudes proportional to the set values of the shutter time and film speed. responding to the light or brightness value Bvo (which represents the brightness or light value Bv of an object measured through a fully open aperture whose value is Avo; $Bv = Avo + Bvo$;) as well as the film speed value Sv and the set shutter time value Tv. Based on the standard relationship $$Bv + Sv = Av + Tv$$

the operational amplifier 68 produces a value Avc. The latter represents the value the fully open aperture value Avo must be stopped down to achieve the required aperture value Av. Thus:

$$\begin{aligned} Avc &= Av - Avo \\ &= Bv + Sv - Tv - Avo \end{aligned} \quad (1)$$

$$= (Bvo + Avo) + Sv - Tv - Avo$$
$$= Bvo + Sv - Tv \qquad (2)$$

An analog to digital converter 70 converts the analog value of the number of diaphragm stops which the aperture is to be closed down from the fully open position to a corresponding digital signal.

A pulse circuit 72 composed of the electrode 52 and slider 56 as well as a resistor 74 produces one pulse each time the slider 56 moves across one tooth-like electrode of the comb 52. The resistor 74 is connected between the grounded electrode comb 52 and a constant voltage source.

Figure 4:
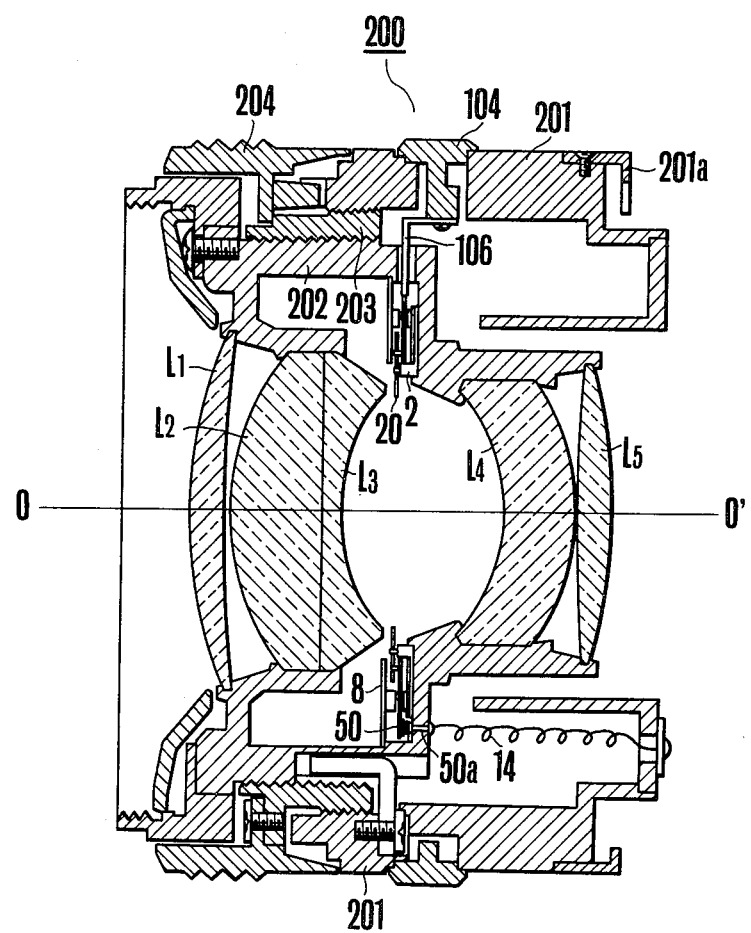
FIG. 4b is a sectional view of a mechanical mounting for an objective lens including a diaphragm unit.

A chattering absorption circuit 76 serves for removing the chattering component from the output signal of the pulse forming circuit 72. A flip-flop 78 forms a diaphragm actuation and de-actuation control circuit and is set by a diaphragm control start signal A occurring when a release button CR of the camera in FIG. 4 is depressed to produce an output signal Q, and reset by a diaphragm control termination signal B to produce an output signal $\bar{Q}$. A mono-stable multivibrator circuit 80 responsive to the Q output of the flip-flop 78 produces a single pulse of very short duration.

A presetable DOWN counter 82 is forcibly reset by the $\bar{Q}$ output of the flip-flop 78. The output of the monostable multivibrator 80 enters the output data of the above-described A/D converter 70 into the counter and hence presets the counter 82. Starting from the preset value, the counter 82 then counts down the number of pulses produced by the diaphragm position sensor 72 through the chattering absorption circuit 76. When the content of the DOWN counter 82 becomes zero, it produces a carry output.

A drive circuit 84 responds to the output signals from the diaphragm actuation control signal forming flip-flop 78 and the presetable DOWN counter 82 for supplying current to the induction coil 14 of the diaphragm unit DU or 1. In the circuit 84 a NAND gate NA1 produces a low in response to a high at the Q output of the circuit 78 and a high inverted output of the presetable DOWN counter 82. An inverter IN1 inverts the output of the NAND gate NA1. A second drive circuit 86 controls the operation of the electromagnet 24 for arresting the rotary member 12. In the circuit 86, a NAND circuit NA2 goes low in response to a high carry output of the presettable DOWN counter 82 and a high Q output of the signal forming circuit 78. An inverter IN2 inverts the output of gate NA2.

The diaphragm unit 1 constructed as in FIG. 5 and the control circuit CC of FIG. 6 operate as follows. The operator first turns the shutter and film speed dials and hence sets a desired value of exposure time and the sensitivity of the used film into the variable resistors 66 and 64 respectively. Then, the camera is aligned to an object intended to be photographed, so that the level of brightness of the object is sensed by the sensor SPC. In response to the signals Bvo, Tv and Sv, the operational amplifier 68 produces an analogue output Avc representing the number of diaphragm stops by which the exposure value or aperture value differs from the maximum possible aperture opening. The A/D converter 70 converts the value Avc to a digital output which is then applied to the data input of the presettable DOWN counter 82.

Prior to this time, the diaphragm actuation control signal forming circuit 78 had responded to the termination of the previous shot and applied a high $\bar{Q}$ output to the reset terminal of the presettable DOWN counter 82 and reset the latter. At the same time, a low Q output from the circuit 78 had turned NAND gate NA1 high and inverter IN1 low. This had de-energized coil 14. Also, the low Q of flip-flop 78 had turned NA2 high, inverter IN2 low and de-energized electromagnet 24. Hence, when a camera release is actuated, the start signal A is applied to the "set" input of the flip-flop 78 and monostable multi-vibrator 80 sets the presettable DOWN counter 82, and at the same time causes the presettable DOWN counter 82 to read in the output data from the A/D converter 70. The output of counter 82 still remains low.

The now high Q output of the circuit 78 also combines with the still low output of counter 82 to cause the first drive circuit 84 to energize the induction coil 14 of the diaphragm unit 1. This is so because the now high inverted input of the NAND gate NA1 and the other high NA2 input changes the NA1 output to a low (logic level 0), and the output of the inverter IN1 is then changed to a high. This turns the rotary member 12 against the force of the spring 22 and simultaneously closes the diaphragm blades 20 down from the fully open position.

As the rotary member 12 moves, the slider 56 moves across the electrode teeth in the electrode comb 52, causing the pulse generator 72 to produce a train of pulses which is then applied through the chattering absorption circuit 76 to the presettable DOWN counter 82. Since the number of pulses counted is proportional to the angle of rotation of the rotary member 12, the presettable DOWN counter 82 produces a high carry output when the number of pulses coincides with the preset digital value. The high carry output combines with the high Q at flip-flop 78 to force gates NA2 low and inverter IN2 high. Thus, the drive circuit 86 changes its output from 0 to 1, at which the electromagnet 24 is energized. The latter turns the arresting or pawl lever 26 against the force of the spring 30 until it engages the rack 12b. The rotary member 12 is then stopped from rotating at a position corresponding to the exposure value, in this instance aperture value Avc derived by the operational amplifier 68. The high carry out from the DOWN counter 82 is inverted and forces NA1 high, IN1 low, and causes the first drive circuit 84 to de-energize the induction coil 14. Although the rotary member 12 is then subject to the action of the return spring 22, the pawl lever 26 continues holding the rotary member 12 in the advanced position for a particular aperture value.

The resultant position of the diaphragm blades 20 defines the aperture value Av which is the fully open or minimum aperture value Avo less the number of diaphragm stops closed down Avc, that is, $$Avo + Avc = Av \qquad (3)$$

The setting of the blades 20 to the required aperture value is followed by actuation of shutter mechanism SM. When the exposure of the film is completed, a diaphragm de-actuating signal B is produced, causing the circuit or flip-flop 78 to be reset. This in turn causes the drive circuit 84 and the control circuit 86 to de-energize the respective magnetic windings 14 and 24. The pawl lever 26 is then disengaged from the rack 12b by the spring 30, and the spring 22 turns the rotary member 12 in the direction opposite to that indicated by arrow F and back to the initial position where the diaphragm blades are fully open.

The embodiments of FIGS. 1 to 6 measures the object brightness through the diaphragm unit at fully open aperture to derive a proper aperture value, and then adjust the position of the diaphragm blades 20 to that aperture value by counting the number of stops closed down in the form of pulses. However, it is also possible to detect the number of diaphragm stops closed down otherwise. This is done by measuring the object brightness during the diaphragm closing operation of the diaphragm unit.

After the diaphragm stop number Avc is computed from the light value Bvo based on the formula (2), and while the light value is changed from Bvo to Bvo', the latter being measured just before the start of a closing down operation, the diaphragm unit stopped down the required number of stops provides a light value Bvo" which may be expressed as:

$$Bvo'' = Bvo' - Avc \quad (4)$$

When attainment of the light value to Bvo" is detected, the rotary member 12 is arrested, thus adjusting the size of aperture opening in accordance with the exposure value.

Because the object brightness remains constant, when the light value measured just before the start of closing down operation Bvo' is equal to the original value Bvo which was used in deriving the exposure value, the timing of arresting the rotary member 12 may be controlled in accordance with a light value expressed by the following formula:

$$\begin{aligned} Bvo'' &= Bvo - Avc \\ &= Bvo - (Bvo + Sv - Tv) \\ &= Tv - Sv \end{aligned} \quad (5)$$

Figure 7:
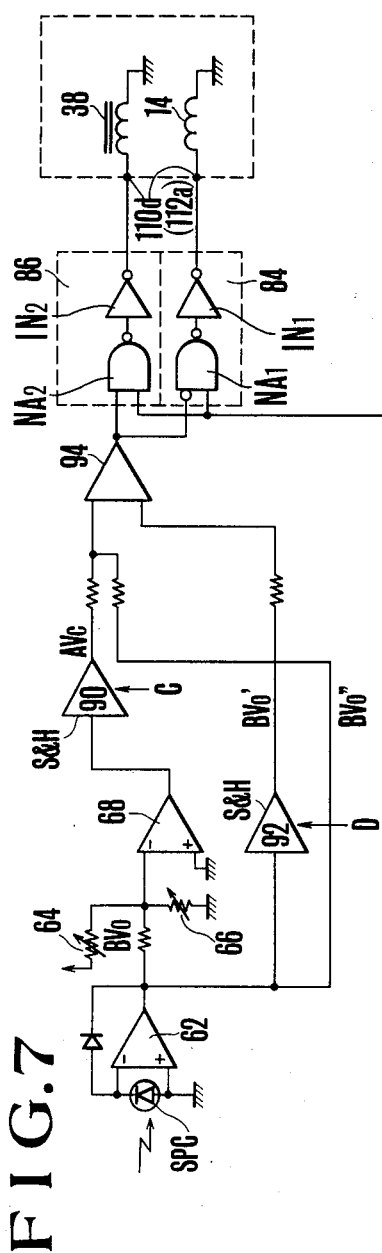
FIG. 7 shows another example of a control circuit for the diaphragm unit.

FIG. 7 illustrates a circuit for controlling the operation of the diaphragm unit of FIG. 1 according to forumula (4). Here, parts corresponding to those in FIG. 6 are denoted by like reference numerals. In FIG. 7 a sample and hold circuit 90 responds to a control signal C for sampling and holding the diaphragm stop down number Avc when the light metering is terminated, or when AE is locked. Another sample and hold circuit 92 responds to a control signal D for sampling and holding the output Bvo' of the light metering circuit 62 which occurs just before the diaphragm starts being stopped down. A comparator 94 compares the sum of the output Avc of the sample and hold circuit 90 and the output Bvo" of the light metering circuit 62 with the output Bvo' of the sample and hold circuit 92, and for producing a high signal "1" when the following inequality is satisfied:

$$Bvo'' + Avc > Bvo' \quad (6)$$

In operation, when a camera release is actuated, the diaphragm unit control start signal A sets the flip-flop 78 and the "set" signal at terminal Q is produced. Since the output of the comparator 94 is low or "0" before the formula (6) is satisfied, the drive circuit 84 energizes the induction coil 14. As the diaphragm blades 20 is being moved from the full open position, and satisfaction of formula (6) is detected, the current supply is cut off at the drive circuit, and the control circuit 86 is actuated to arrest the rotary member 12.

In FIG. 7, as in FIG. 6, it is possible to control the diaphragm stop down number Avc as predetermined. Therefore, even when Bv is changed after an AE lock or the like, the required aperture value can be controlled.

Figure 8:
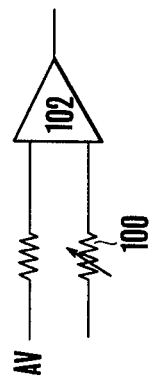
FIG. 8 shows still another example of a control circuit.

FIG. 8 shown another example of the circuit for controlling the operation of the diaphragm unit of FIG. 1 according to formula (5) defined above. Here a comparator 98 produces a higher logic "1", when the output of the computer 62 becomes negative, that is, when the following inequality is satisfied:

$$Bvo'' + Sv - Tv > 0 \quad (7)$$

In such a circuit, for the given film sensitivity Sv and shutter speed Tv it is possible to derive a proper exposure value in connection with the actual stopping down operation of the diaphragm unit. As a result the accuracy of aperture control is relatively high.

The invention contemplates using any of the control circuits shown as the control circuit CC with any of the units operating as the unit DU. According to another embodiment where a desired aperture value is preselected, the operational amplifier 68 and sample and hold circuit 90 of FIGS. 6 and 7 are omitted, and instead a circuit for controlling the exposure time Tv in accordance with the exposure value is added. According to yet another embodiment the operational amplifier 68 is entirely digital. According to yet another embodiment, the position sensor for the rotary member 12 of FIG. 5 is constructed in the form of a potentiometer. In this case, the A/D converter 64 and presetable DOWN counter 82 of FIG. 6 are replaced by a comparator. This is achieved by mere replacement of analogue techniques with digital techniques.

Figure 9:
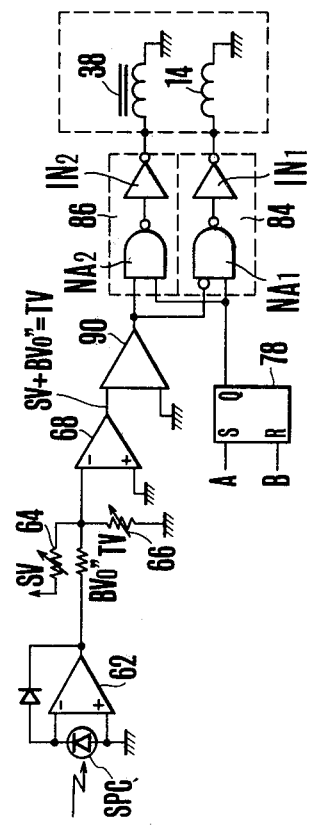
FIG. 9 is a fragmentary circuit diagram illustrating a further example of a control circuit.

In another embodiment the potentiometer for the rotary member 12 produces an output which represents not the number of stops closed down Avc, but an absolute aperture value Av. Then, it is necessary that as shown in FIG. 9, the effective Av value and the output of the potentiometer 100 be compared by a comparator 102 having an output which controls the timing of energization of the induction coil 14 and the magnetic winding 24. In this case, if it is necessary to derive an Av value from the preset Tv value and Sv value based on the TTL-light metering, a system must be provided for computing the Av value based on the following formula:

$$Bvo + Avo + Sv - Tv = Av \quad (8)$$

Where the value Av is set as an exposure factor, on the other hand, this provision is of course unnecessary.

According to an embodiment of the invention the exposure control circuit is provided with a manual mode. For this purpose, as shown in FIG. 10a, the member 106 extending radially inwardly from the diaphragm ring 104 is rotatably fitted on the outer diameter of the body tube in the lens mounting and is engageable with a projection 12d on the rotary member 12. Hence, when the diaphragm ring 104 is turned from its AUTO position into a range of aperture values, the rotary member 12 is turned in the direction of arrow F by the member 106 engaging the projection 12d against the force of the spring 22. This stops down the diaphragm blades 20. When the manual mode is selected, a switch 108 adjacent the member 106 opens upon selection of the manual mode so that the current supply to the coil 14 and the magnet 24 is no longer possible. This disables the coil 14 and winding 24.

Figure 10:
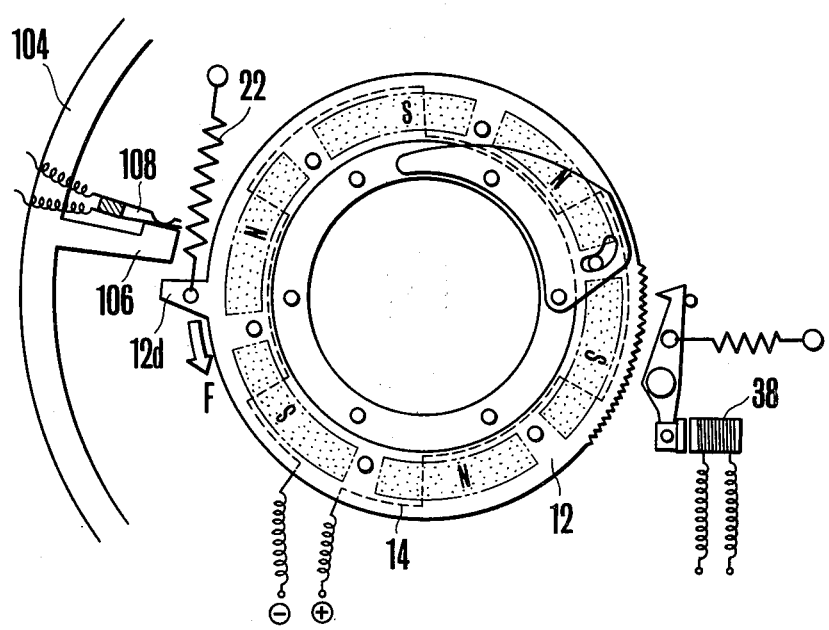
Figure 10B:
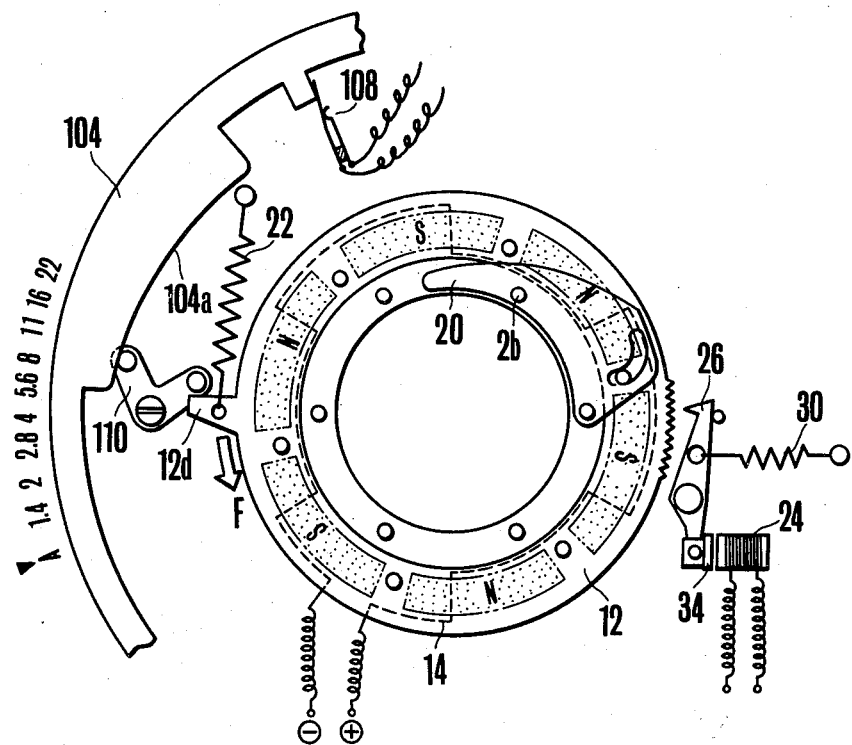

FIG. 10b shows an example of improvement of the mechanism of FIG. 10a. When the diaphragm ring 104 is manually setting a desired aperture value, the angle of rotation of the diaphragm ring 104 is increased to effect equivalent movement of the rotary member 12. This facilitates not only reliable setting of the diaphragm but also accurate adjustment in position of the rotary member 12 particularly when the aperture value is small. For this purpose, a bell crank 110 is arranged in a space between the arm 12d of the rotary member 12 and a cam lobe 104a formed in a portion of the inner periphery of the ring 104. The camming surface of the cam lobe 104 is configured to turn the bell crank 110 clockwise as the diaphragm ring 104 is turned counter-clockwise and to shift a graduation on the aperture value scale from an automatic exposure mode mark A into registry with an index.

The mark A may be otherwise positioned in coincidence with the minimum possible aperture value, in this case, 1.4. In either case, the rotary member 12 is urged in a direction to fully open the diaphragm blades 20. This makes it possible to perform the light metering at full open aperture.

Figure 12:
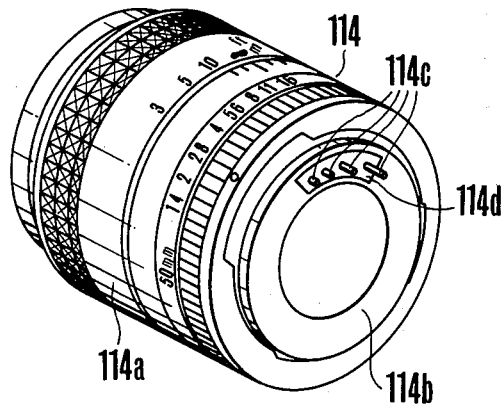
FIG. 12 is a perspective view of an example of a unit in another interchangeable lens embodying features of the invention.
Figure 11:
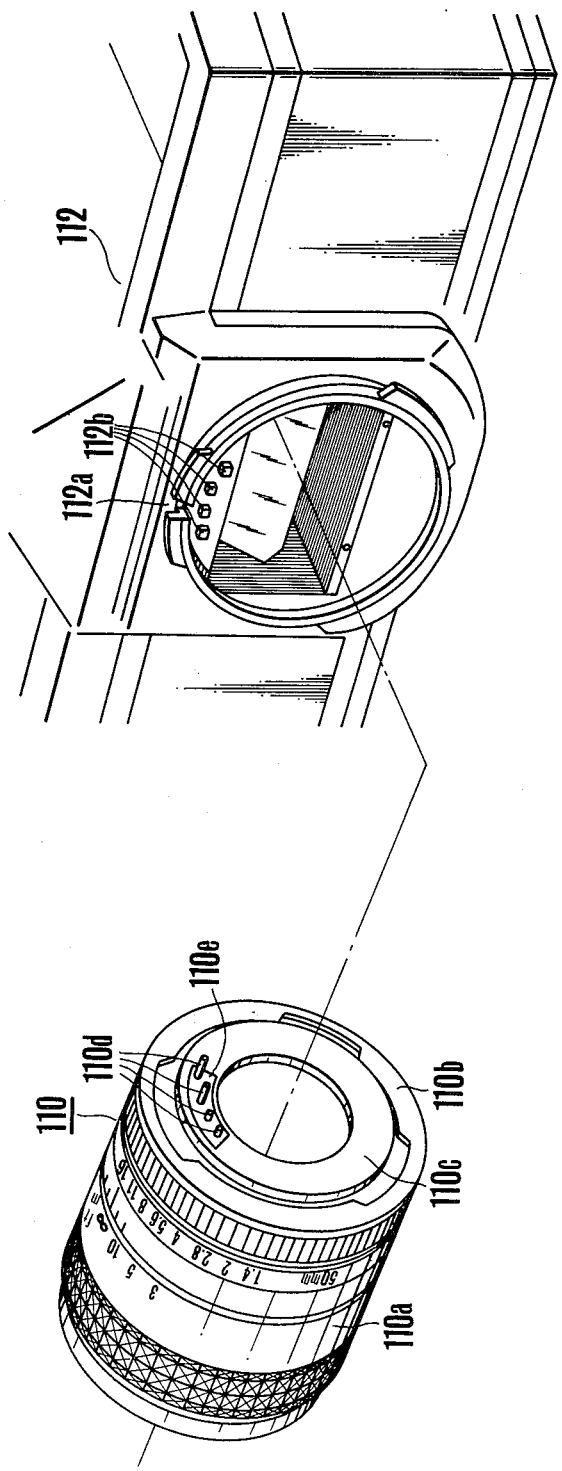
FIG. 11 is a perspective view of a single lens reflex camera composed of a body and an interchangeable lens and embodying features of the present invention.

FIGS. 11 and 12 show two examples of electrical signal channels between an interchangeable lens 110 corresponding to the lens IL employing the diaphragm unit 1 or DU of FIGS. 1 to 5 and 10 and a camera body 112 corresponding to the camera body CB and employing an exposure control circuit with the control circuits CC shown in detail in FIGS. 6 to 9.

The interchangeable lens 110 shown in FIG. 11 includes an objective lens, a diaphragm unit corresponding to unit DU shown in FIGS. 6 to 9 and lens mounting elements. Its lens barrel 110a on which a distance adjusting ring, a diaphragm setting ring or the like are fitted, is provided with a so-called spigot bayonet mount type mounting ring 110b. This type of interchangeable lens 110 permits the tubular body 110a containing the diaphragm unit 1 to remain stationary with reference to the lens abutment surface, for example the bayonet member 112a on the camera housing when they are coupled with each other and the bayonet member 110b on the lens mounting is turned to tighten the lens. This affords a great advantage for the incorporation of the electronically operated diaphragm unit 1 of the invention into such an interchangeable lens mounting. That is, it permits a number of connectors 110d to be mounted on the rear surface of the wall of an adapter shell 110c which is directly or indirectly held on the tubular body 110a. These connectors 110d terminate at the induction coil 14 and the magnetic winding 24 of the diaphragm unit 1. The same number of connectors 112b are arranged on the camera housing in alignment with the connectors 110d respectively. When coupled current supply channels are established through connectors 112b which serve as the outlets of the drive circuit 84 and control circuit 86 of FIGS. 6 and 9.

FIG. 12 shows an internachangeable lens which differs from that of FIG. 11 in that the bayonet member is fixedly secured to the outer lens barrel 114a, and the adapter shell 114b is axially fixed but rotatable about the optical axis relative to the outer lens barrel 114a. To attach the interchangeable lens to the camera body, a position adjusting pin on the adapter shell 114b engages a recepter on the camera housing, and then the outer lens barrel is turned relative to the camera body so as to tighten the bayonet coupling. In FIG. 12, the shell 114b may be fixed with reference to the outer lens barrel 114a. Hence an old type bayonet mount may be employed.

The interchangeable lens 114 of FIG. 12, similar to the lens of FIG. 11, the adapter shell 114a holds a number of connectors 114c electrically connected through lead wires to the coil 14 and the magnetic winding 38 in the magnet 24. These connectors 114c are arranged so that when the lens is attached to the camera body of FIG. 11, the signals from the camera body are transmitted through the channels of connectors 112a contacting with the connector 114c to the diaphragm unit 1. Insulator members 110e, 112b and 114d serve to prevent electrical shorting of the connectors with each other and with some of the metallic parts of the lens mounting and the camera housing.

The present invention furnishes a diaphragm device which can be controlled electrically and permits a camera system to be constructed with a substantial degree of freedom. It affords great economic advantages.

The invention provides a diaphragm device whose blade opening and closing operation is electromagnetically controlled and which can be incorporated within a small space within a lens barrel. Object brightness information and preset exposure factor data are processed in the camera housing to derive aperture information, and current is supplied to the diaphragm device to move the diaphragm blades. When the derived aperture value is attained, the diaphragm blades are stopped. The size of the diaphragm aperture is controlled purely by electrical effects.

By furnishing a diaphragm device with means for stopping motion of the diaphragm blades electromagnetically, the accuracy of adjustment of the position at which the diaphragm blades stop is high. This helps obtain a precise exposure control.

The present invention saves electrical energy which would be otherwise used up on operating the electromagnetically controlled diaphragm device within the lens barrel by making the start of current supply to the diaphragm device coincident with an actuation of the camera release. Then, when the required aperture value is reached by the blades, the current supply is terminated. This prevents wasteful energy consumption.

While embodiments of the invention have been described in detail, it will be evident that the invention may be embodied otherwise without departing from its spirit and scope.

What is claimed is:

1. An electromagnetically operated diaphragm device for a lens assembly comprising:
   (A) an electromagnetic unit including:
   (a) two sets each having a plurality of magnet members arranged circularly around an optical axis within said lens assembly, the members in each set having poles, the poles of one set facing opposite poles of the other set;
   (b) a rotary member arranged in a space between said two circles of magnet members and carrying a coil having portions extending in directions relative to the magnet members to produce rotary movement of the rotary member in response to current through the coil; and
   (c) diaphragm blades positioned between said magnet members and said rotary member, said diaphragm blades being pivoted on said rotary member and forming a variable aperture depending upon the position of rotation of said rotary member; and (B) diaphragm blade stopping means for stopping movement of said diaphragm blades due to the rotation of said rotary member, said diaphragm blade stopping means stopping said rotary member from further rotation so that the size of the aperture opening defined by said diaphragm blades is adjusted to a given value.

2. An electromagnetically operated diaphragm device for a lens assembly comprising:

(A) an electromagnetic unit including:
  (a) a cylinder like mount fixed on said lens assembly, the shoulder of a cylindrical portion of said mount having a first engagement portion for engagement with diaphragm blades;
  (b) two ring like members fixed in said lens assembly;
  (c) a plurality of permanent magnet members mounted on each of said ring like members and having poles, said magnet members each having an arc shape and arranged so that poles on one ring like member face opposite poles on the other ring like member;
  (d) a rotary member arranged between said magnet members to be rotatable about an optical axis, said rotary member having an engagement portion, said rotary member having a coil cooperating with said magnet members to electrically rotate said rotary member when energized, and a first engagement portion for engagement with diaphragm blades;
  (e) diaphragm blades, said diaphragm blades being arranged between said rotary member and said magnet members and having a first engagement portion for engagement with the engagement portion of said mount, and a second engagement portion for engagement with the engagement portion of said rotary member, and forming an aperture opening depending upon rotation of said rotary member; and (B) stopping means for stopping rotation of said rotary member, said stopping means having electromagnetic means actuable by an external electrical signal to stop said rotary member from further rotation by said electromagnetic means and adjust the size of aperture opening.

3. An electromagnetically operated diaphragm device according to claim 1 or 2, where said stopping means comprises:
  (a) an engagement portion formed on the outer periphery of said rotary member;
  (b) a latching member pivotally mounted in said lens assembly and arranged to engage said engagement portion; and
  (c) electromagnetic means responsive to an external electrical signal for attracting said latching member to latch said rotary member at said engagement portion so that the rotary member is stopped from further rotation.

4. An electromagnetically operated diaphragm device according to claim 1 or 2, wherein said stopping means comprises:
  (a) electromagnetic means is actuable in response to an electrical signal from the outside; and
  (b) a brake lever responsive to the actuation of said electromagnetic means to clamp said said rotary member to prevent further rotation of said rotary member.

5. A diaphragm system device for controlling the size of an aperture on the basis of an exposure value determined from object brightness and preset exposure factor data comprising:
  (a) electro-magnetic diaphragm means having a plurality of magnet members positioned circularly around an optical axis and fixedly secured to a lens assembly and oriented so that surfaces of members facing each other are of opposite polarity, a rotary member rotatably supported about an optical axis between the circle-wise arranged magnet members and having an electromagnetically energizable coil, and diaphragm blades forming a variable aperture opening as said rotary member rotates;
  (b) detecting means for detecting the amount of rotation of said rotary member;
  (c) a drive circuit for controlling the current supply to said coil for electromagnetic induction and producing an electromagnetic induction effect between said coil and said magnet members to cause rotation of said rotary member and drive said diaphragm blades; and
  (d) control means responsive to an exposure signal due to the object brightness and preset exposure factor information and a signal from said detecting means for controlling rotation of said rotary member so as to terminate the closing operation of said diaphragm blades.

6. A diaphragm system according to claim 5, wherein said control means comprises:
  (a) an analogue to digital converter for producing a digital signal representing exposure information based on the brightness and preset exposure factor data;
  (b) pulse forming means for producing a number of pulses corresponding to the amount of rotation of said rotary member;
  (c) diaphragm actuation control means, said means producing a control start signal and a control termination;
  (d) a counter for presetting the digital signal from said converter, and counting down in response to signals from said pulse forming means to produce a count termination signal; and
  (e) electromagnetic means responsive to said count termination signal from said counter for stopping further rotation of said rotary member.

7. A diaphragm device according to claim 6, further including
  (a) means responsive to the output signal of said diaphragm actuation control means and said comparison signal for controlling the current supply to said electromagnetic induction coil.

* * * * *